Patented Feb. 10, 1948

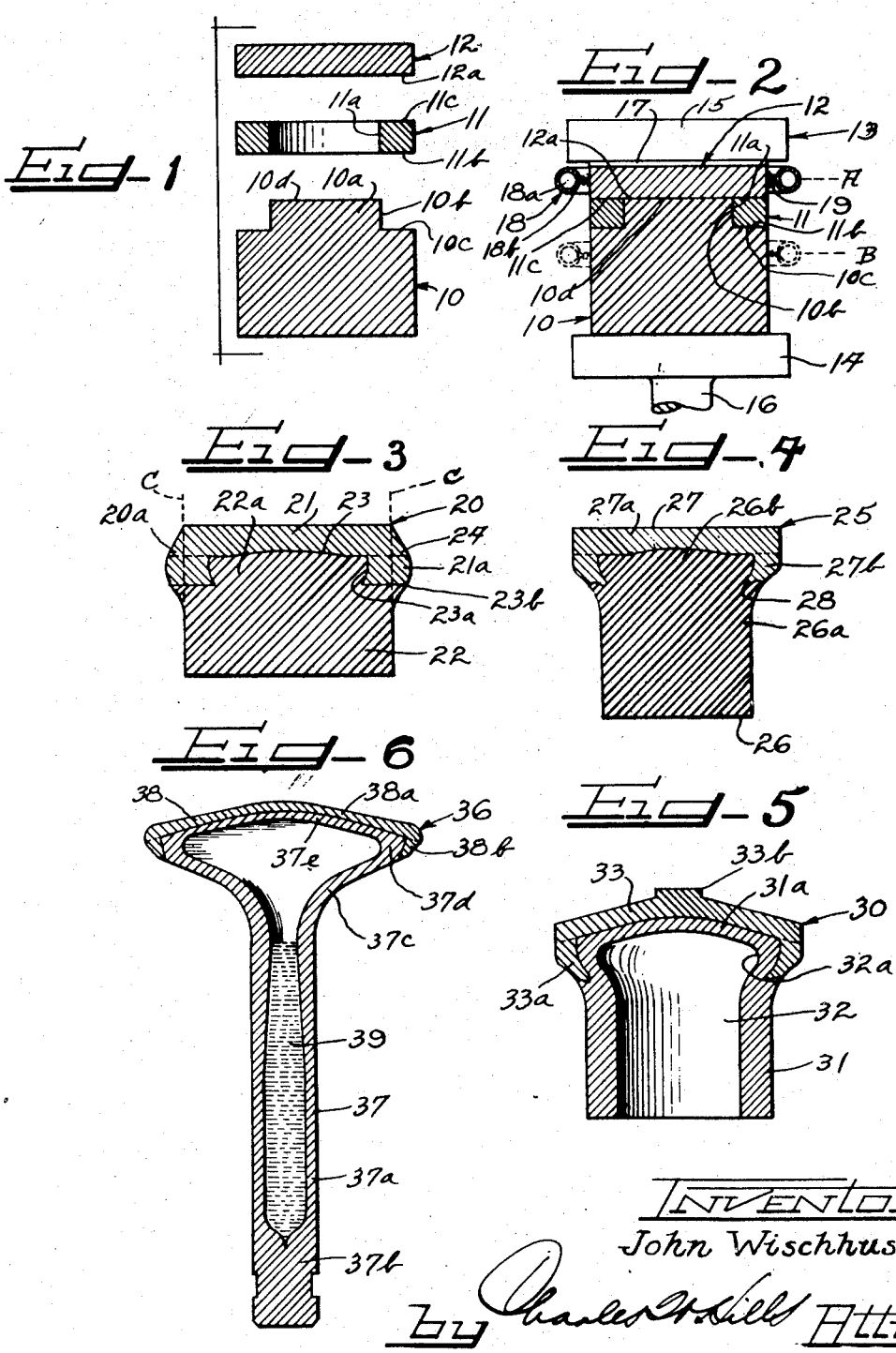

2,435,948

UNITED STATES PATENT OFFICE 2,435,948

METHOD OF PREPARING COMPOSITE POPPET VALVES

John Wischhusen, Euclid, Ohio, assignor to Thompson Products, Inc., Cleveland, Ohio, a corporation of Ohio Application September 8, 1944, Serial No. 553,158

4 Claims. (Cl. 29—156.7)

1

This invention relates to the preparation of poppet valves having composite head dome and seat portions composed of forgeable stress-resistant metal clad with corrosion-resistant metal.

Specifically the invention deals with the simultaneous welding together of a metal billet of tough, stress-resistant forgeable steel, a ring of corrosion-resistant metal to form a seating face for a valve and a disk of corrosion-resistant metal to form a cover for the head of the valve whereby heretofore-necessary puddling operations for forming the valve seat face are eliminated.

Composite metal poppet valves having corrosion-resistant valve head covers and corrosion-resistant seating faces have heretofore only been made by puddling operations which weld molten, corrosion-resistant alloy to the valve body member and, in some instances, to the corrosion-resistant valve head cover. These puddling operations, however, deleteriously affect the metal and great care must be taken to avoid burning. Even when the puddling operation is carefully performed, the high temperatures necessary to melt the corrosion-resistant metal cause grain changes to occur in the valve body metal. These grain changes deleteriously affect the strength of the valve.

In accordance with this invention, a billet or slug of tough, stress-resistant valve body metal is formed with a reduced-diameter end portion providing a flat shoulder inwardly from one end thereof. This reduced-diameter portion has a ring of corrosion-resistant metal tightly fitted thereon by press or shrink-fitting operations, with the ring bottomed on the shoulder. The reduced-diameter portion of the billet and the ring are finished to a flat uniform dimension and are covered with a disk of corrosion-resistant metal. The billet, ring, and disk are then simultaneously subjected to a pressure welding operation for production of a composite blank. The ring is simultaneously welded to both the billet and the disk, while the disk is also welded to the billet. The ring provides metal along the side of the composite blank for the seating face of a valve to be made from the blank. The disk provides metal for forming the cover on the head of the valve to be made from the blank.

The invention eliminates the heretofore-necessary puddling operation for forming valve seating faces of highly corrosion-resistant metal on poppet valves.

It is, then, an object of this invention to provide a method of manufacturing composite poppet valves with corrosion-resistant seating faces without the necessity for puddling the corrosion-resistant metal onto the valve body.

A still further object of the invention is to form poppet valves with corrosion-resistant metal-clad head and seating faces simultaneously secured to a billet of valve body metal.

Another object of the invention is to form, by a pressure welding operation, a poppet valve having a corrosion-resistant seating face formed from a separate ring of metal.

Another object of the invention is to form aircraft engine exhaust valves having head and seating face portions clad with corrosion-resistant metal in integral bonded relation to the valve body metal without involving a fusing of either the body metal or the cladding metal except along the weld line therebetween.

A still further object of this invention is to provide a method of making composite poppet valves by welding a ring and a separate cladding disk of the same metal as the ring onto a billet to avoid formation of voids such as would occur if the ring and cladding disk were in one piece.

Other and further objects of the invention will be apparent to those skilled in the art from the following detailed description of the annexed sheet of drawings which, by way of preferred example, illustrate one embodiment of the invention.

On the drawings:

Figure 1 is a vertical cross-sectional exploded view of the parts forming the composite blank for the process of this invention.

Figure 2 is a vertical cross-sectional view of the composite blank mounted in a pressure welding device for pressure welding of the parts.

Figure 3 is a vertical cross-sectional view of the composite blank formed from the pressure-welding operation of Figure 2.

Figure 4 is a vertical cross-sectional view of a blank formed from the blank of Figure 3 by extruding.

Figure 5 is a cross-sectional view of a blank formed from the blank of Figure 4 by piercing, machining and cutting operations.

Figure 6 is a vertical cross-sectional view of a finished hollow poppet valve having the head portion thereof clad with corrosion-resistant metal and having a corrosion-resisting metal seating face.

As shown on the drawings:

In Figure 1, the reference numeral 10 designates generally a cylindrical solid metal billet or slug composed of forgeable stress-resistant material such as an austenitic steel. This slug is to form the body portion of the poppet valve according to this invention and, if heat and corrosion-resistant properties are desired in this body portion of the valve, the billet or slug metal can be a nickel chromium alloy austenitic steel such as steel having the following formula:

| | Per cent |
|---|---|
| Nickel | 14 |
| Chromium | 14 |
| Tungsten | 2.4 |
| Carbon | 0.45 |
| Molybdenum | 0.35 |

Remainder substantially all iron.

The billet 10 has a reduced diameter pilot portion 10a at one end thereof bounded by a cylindrical side wall 10b of a diameter less than the diameter of the billet. A flat shoulder 10c is thus provided on the billet around the base of the pilot portion 10a. The pilot portion 10a has a flat top 10d.

A ring 11 of rectangular cross section is provided for yielding corrosion-resistant metal to produce the valve seat face or seating ring according to this invention. A solid flat disk 12 also composed of corrosion-resistant metal is provided for forming the cladding or cover for the valve head according to this invention.

The ring 11 and disk 12 are composed of corrosion-resistant metals, examples of which are: nickel, chromium, and iron alloys; nickel, molybdenum and iron alloys; non-ferrous nickel-chromium alloys; chromium-tungsten alloys, and the like.

The ring 11 has a flat cylindrical inside wall 11a concentric with but of a diameter somewhat less than the diameter of the wall 10b of the pilot portion 10a, so that the ring only fits around the pilot portion with a shrink or press fit. The ring 11 also has a flat bottom face 11b for fitting on the shoulder 10c of the billet 10 together with a flat top face 11c adapted to be seated flush on the top face 10d of the pilot portion 10a when the bottom face 11b is bottomed on the shoulder 10c. To insure complete mating of the bottom face 11b and shoulder 10c these surfaces can be given a grind finish.

The disk 12 has a flat bottom face 12a. In order to insure complete mating contact between the bottom face 12a of the disk 12 and the top faces 11c and 10d of the ring and billet throughout the entire mating areas of these members, it may be desirable to grind and polish the end faces 10d and 11c after the ring has been tightly fitted onto the pilot portion 10a by a press fitting or a shrink fitting operation. The face 12a should have a similar ground and polished finish.

As shown in Figure 2, the composite assembly of billet 10, ring 11 and disk 12 is placed in a high pressure welding apparatus 13 on the press platen 14 thereof. The platen 14 is moved toward a fixed platen 15 by means of a pressure-actuated ram 16. A mica disk 17 is interposed between the platen 15 and the disk 12 to prevent the disk 12 from sticking to the platen 15 during the welding operation.

The ram 16 exerts pressures of from 4,000 to 6,000 lbs. per square inch of contacting surface between the bottom face 12a of the disk and the top faces 10d and 11c of the billet and ring. The specific desired pressure will vary, depending upon the alloys used for the billet ring and disk.

A torch ring 18 embraces the composite assembly in the apparatus 13 and defines an annular passageway 18a completely enveloping the assembly. The ring 18 has a plurality of jet holes 18b at spaced intervals around its inner periphery to join the passageway 18a with the periphery of the composite assembly.

Acetylene and oxygen is fed to the passageway 18a of the ring 18 and the mixture of gases bleeds out through the jet holes 18b to form jets 19 which are ignited for impinging upon the composite assembly.

The ring 18 is reciprocated axially of the composite assembly to cover an area on both sides of the contacting surfaces of the disk with the billet and ring and of the ring with the billet. The ring 18, for example, may be oscillated between levels designated by the lines A and B.

In addition, the ring 18 is oscillated during its up and down reciprocal movements so that the jets 19 will not impinge upon the same spots around the assembly. The oscillation is usually an arc of about 15°.

The jets 19 heat the assembly inwardly from the outer peripheries thereof so that, for example, the contacting pairs of surfaces 12a and 11c; 12a and 10d; 11a and 10b; and 11b and 10c; are heated by conduction to welding temperatures. These pairs of surfaces are sealed by the pressure apparatus due to their exact mating fits so that air, dirt, or any foreign matter is excluded and the resulting welds are free from slag. The welding temperatures are below the melting points of the metals and the heating time and temperatures developed will depend upon the compositions of the metals. For disks and rings composed of non-ferrous nickel-chromium alloys and base metal billets composed of valve steels, welding temperatures of around 2300° F. are reached.

During the heating operation, the composite assembly is continually subjected to the selected pressure within the 4,000 to 6,000 lb. per square inch range by the pressure ram 16 and, in about eleven minutes, three inch diameter billets and disks are usually heated to their welding temperatures, and the softened metals bow outwardly adjacent the weld lines to produce a blank 20, shown in Figure 3, which is generally cylindrical with flat end walls but with a bulge 20a in the side wall thereof adjacent one end wall. The blank 20 is composed of a cap 21 with an integral shoulder 21a on a body portion 22 having a pilot end 22a surrounded by the shoulder 21a.

The cap 21 is secured to the billet 22 along a weld line 23 having a somewhat wavy contour with a top wall having a central convex portion merging into concave outer peripheral portions and depending as at 23a downwardly in a bowed or curved path to a substantially flat outwardly extending line portion extending outwardly from the top portion of the weld line 23.

The cap 21, of course, is formed from the disk 12 and the shoulder 21a on the cap is formed from the ring 11. The body portion 22 is formed from the billet 10.

In place of flame jets for heating in the pressure welding process, heating by electric induction can be used.

The outwardly bowed or beaded portion 20a of the blank 20 is ground off of the blank to the dotted lines C—C of Figure 3 to produce a straight cylindrical blank.

The blank 20 of Figure 2, after being ground into cylindrical shape, is heated to forging temperatures of about 1950° to 2050° F. and is partially extruded to produce the headed cup-shaped blank 25 of Figure 4. The blank 25 of Figure 4 is composed of a cup-shaped member 26 formed from the billet 10 having a cylindrical side wall 26a and an end wall 26b receiving a cap 27 thereon with a portion 27a of the cap covering the top of the end wall 26b and with a skirt portion 27b surrounding the end wall 26b and joined with the cup member along a wavy line 28 formed by the extruding operation from the weld lines 23a and 23b of Figure 3. The cylindrical wall 26a of the cup is of smaller diameter than the diameter of the head 27, since the cup is reduced by the extruding operation.

The blank 25 of Figure 4 is next subjected to further operations, including piercing and machining operations, to provide a blank 30 of Figure 5. The blank 30 has a cup-shaped body portion 31 with a cylindrical recess 32 pierced therein. The piercing operation changes the contour of the original wavy weld line 28 to a continuous arcuate contour. The recess 32 is undercut to provide an enlarged head cavity 32a adjacent the blind end wall 31a thereof. The end wall 31a of the blank 30 is covered with a cap 33 having a skirt portion 33a surrounding the upper end of the cup member. The cap 33 is machined to form a lathe-centering lug 33b at the axial center of the blank.

The blank 30 of Figure 5 is further forged and machined to produce the finished poppet valve 36 of Figure 6. This poppet valve 36 has a body portion composed of the billet metal 10 formed from the cup 31 and a cladding or cover on the head of the body portion composed of the disk and ring metal and formed from the head 33 of the blank 30.

As shown in Figure 6, the poppet valve 36 is composed of a main body 37 and a head 38. The main body 37 has a hollow tubular stem portion 37a with a solid tip or bottom end 37b and an outwardly flaring upper neck end 37c. The neck 37c is bounded by an outer peripheral upstanding portion 37d having a covering dome 37e. The body 37 thus has head and stem portions defining a head and stem cavity partially filled with coolant 39 such as sodium or the like. The head and stem cavities receiving the sodium are defined only by body metal from the billet 10.

The cover or cladding 38 includes a head dome cover or cladding portion 38a formed from the disk 12 and a depending skirt portion 38b formed from the ring 11. This skirt portion surrounds the upstanding peripheral portion 37d of the valve body and defines the valve seating face. It is welded to the portion 38a as indicated above and, of course, is welded to the body portion.

From the above descriptions it will be understood that the invention produces a composite hollow poppet valve with a main body portion composed of tough, stress-resisting metal and having a head covered with an integrally connected skirted cover forming a corrosion-resistant cladding for the head dome and seating face of the valve. The skirt of the cover is formed initially from a ring that is separate from the valve dome covering portion of the cover.

The valve head cover and the valve seating face are integrally welded to the body of the valve without melting the covering metals beyond their softening points, so that molten puddling-on operations are avoided.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. The method of forming a poppet valve which comprises forming a cylindrical metal billet of tough forgeable valve steel with a reduced-diameter pilot portion on one end thereof, tightly fitting a ring of corrosion-resistant metal onto the pilot portion of the billet, covering the ring and pilot portion of the billet with a disk of corrosion-resistant metal, welding the billet, ring and disk together to form a composite blank having a body portion composed of billet metal covered at one end by a skirted cap, extruding the body portion of the blank to a reduced diameter size, terminating the extruding operation before the disk metal has been deformed but after the ring metal has been partially extruded and deformed into the body metal to provide a headed blank with the ring metal defining a shoulder between the head and reduced-diameter body, piercing the body of the headed extruded blank, terminating the piercing operation in the head of the blank and in advance of the weld line between the disk and body portions of the blank to form a headed recessed cup-shaped blank, under-cutting the blind end of the recess in the cup-shaped blank to form an enlarged head and cavity in the cup, forging the undercut cup-shaped blank to form an elongated stem from the body portion thereof, and shaping the resulting stemmed blank into poppet valve shape and size to thereby provide a poppet valve having a main body composed of the billet metal and clad at the head end thereof with a skirted cover composed of the disk and ring metal.

2. The method of making a poppet valve with a corrosion-resistant metal-clad head and seating face without puddling corrosion-resistant metal onto a valve body which comprises forming a metal billet of valve steel with a reduced-diameter end pilot portion, tightly fitting a ring of corrosion-resistant metal around the pilot portion of the billet, forming flush flat end faces on the pilot portion and ring, covering the ring and pilot portion of the billet with a corrosion-resisting disk having a flat end face to place the end face of the disk in full intimate contact with the flush flat end faces of the pilot portion and ring, welding the billet, ring and disk together to produce a composite blank having a main body portion composed of the billet metal covered on one end by a skirted cover composed of the ring and disk metal, extruding the main body portion of the composite blank to a reduced diameter size, terminating the extruding operation after the ring portion of the composite blank has been partially extruded to form an inclined shoulder connecting the reduced-diameter body portion with the unreduced-diameter disk portion, piercing the extruded body portion to form a hollow cup therefrom, terminating the piercing operation in advance of the disk metal, undercutting the blind end of the pierced cup to form an enlarged cavity therein, terminating the undercutting operation in advance of the ring metal, and forging the cup into an elongated hollow stem thereby producing a poppet valve-shaped member having a body portion composed of the billet metal and a head portion clad with a skirted cover composed of the ring and disk metals.

3. The method of making composite poppet valves which comprises forming a metal blank with a reduced-diameter cylindrical end portion and a flat shoulder at the base of the end portion, tightly fitting a ring of corrosion-resistant metal onto the reduced-diameter portion of the blank in full seating relation with the shoulder of the blank, finishing the exposed end faces of the ring and the reduced-diameter cylindrical end portion of the blank to provide a flush flat end surface on the assembly, finishing an end face of a corrosion-resistant metal disk to provide a flat end surface thereon to mate with the end surface of the assembly, placing the finished end surfaces of the disk and assembly together in full contacting relation to cover the assembly with the disk, welding the assembly together at pressures of about 4000 to 6000 lbs. per square inch of contacting surface and at temperatures less than the melting point of the corrosion-resistant metal to thereby produce a composite metal blank with a bowed side wall, removing the bowed portion of the side wall of the composite metal blank, extruding the billet metal of the composite blank to a reduced-diameter size, terminating the extrusion operation in advance of the disk metal, piercing the reduced-diameter portion of the extruded blank to form a cup from the billet metal, and forging the resulting pierced blank to form thereon an elongated hollow stem with an outwardly flaring head portion covered with corrosion-resistant metal from the disk and having a peripheral rim covered with corrosion-resistant metal from the ring.

4. In the method of making poppet valves having corrosion-resistant metal clad heads and seating faces, the steps which comprise forming a metal billet with a reduced-diameter end pilot portion having an upstanding cylindrical side wall and a flat shoulder extending outwardly from the end of the side wall, seating a flat-faced ring of corrosion-resistant metal around the pilot portion of said shoulder in intimate contact with the pilot portion and shoulder, forming flush flat end faces on the pilot portion and ring, covering the ring and pilot portion with a corrosion-resistant disk having a flat end face, placing the end face of the disk in full intimate contact with the flush flat end faces of the pilot portion and ring, and welding the billet, ring and disk together under pressure to produce a composite blank having a main body portion composed of billet metal clad at one end with a skirted cover composed of the disk and ring metals.

JOHN WISCHHUSEN.

REFERENCES CITED

The following references are of record in the file of this patent:

UNITED STATES PATENTS

| Number | Name | Date |
|---|---|---|
| 1,121,619 | Ellery | Dec. 22, 1914 |
| 1,554,997 | Ford | Sept. 29, 1925 |
| 1,644,793 | Rich | Oct. 11, 1927 |
| 1,826,542 | Hervig | Oct. 6, 1931 |
| 1,973,855 | Long | Sept. 18, 1934 |
| 2,052,862 | Armstrong | Sept. 1, 1936 |
| 2,138,528 | Phillips | Nov. 29, 1938 |
| 2,177,192 | Scrimgeour | Oct. 24, 1939 |
| 2,183,254 | Charlton | Dec. 12, 1939 |
| 2,359,477 | Hoern | Oct. 3, 1944 |

FOREIGN PATENTS

| Number | Country | Date |
|---|---|---|
| 22,491 | Great Britain | 1905 |